United States Patent Office 2,959,486
Patented Nov. 8, 1960

2,959,486
DEHYDRATION OF FRUIT AND VEGETABLE JUICES

Sumner I. Strashun, El Cerrito, and William F. Talburt, Berkeley, Calif., assignors to the United States of America as represented by the Secretary of Agriculture No Drawing. Filed Jan. 30, 1953, Ser. No. 334,384

4 Claims. (Cl. 99—206)

(Granted under Title 35, U.S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the dehydration of fruit and vegetable juices, purees, pulps, extracts, infusions, nectars, blends of different juices, etc.; materials of this type being generically referred to herein as an edible liquid material of plant origin.

One object of this invention is the provision of processes for dehydrating such materials whereby to obtain solid dried products which are characterized by their unusual and desirable properties, as follows: the products are of a free-flowing nature and do not gum or coalesce when exposed to air for reasonably long periods of time but retain their free-flowing character; the products have an expanded, sponge-like porous structure whereby they exhibit an extremely high rate of rehydration when stirred with water to prepare a reconstituted juice. Another object of the invention is the provision of methods to yield the aforementioned type of product in a very short period of processing time and with a minimum of damage to the natural flavor and vitamin content of the plant liquid. A particular object of the invention is the provision of a method which involves removing all or part of the pulp from the liquid material prior to dehydration whereby to ensure expansion of the material during the dehydration cycle thus to obtain accelerated dehydration and to obtain a porous product which can be rapidly reconstituted. Additional objects and advantages of this invention will be obvious from the description herein.

The successful dehydration of fruit and vegetable juices, purees, etc. presents a difficult problem—difficult because of the complex nature of these materials and the many factors which must be taken into consideration. Some of the more important aspects which must be considered in any juice dehydration procedure are as follows:

(1) The natural odor and flavor of the product must be retained as much as possible to obtain a high quality product. This requires careful control because of the delicate nature of the constituents which give the material its distinctive flavor.

(2) The procedure must avoid formation of off-flavors and odors, otherwise the natural taste of the product will be impaired or completely masked. Thus fruit and vegetable juices contain many constituents which are potentially reactable to produce bad-flavored end products, for example, reducing sugars and nitrogen-containing compounds which are capable of reacting to form products of undesirable odor and flavor.

(3) The nutritional components of the juice must be retained. Some of the nutritive components, such as vitamin C, are sensitive to heat and precautions must be taken that these valuable constituents are not destroyed.

(4) The natural color of the product must be preserved as much as possible as consumers demand products of natural color. Further, color is often an index to development of off odors and flavors because the reaction of reducing sugars with nitrogenous constituents (browning reaction) gives rise to highly colored products of undesirable odor and flavor.

(5) The final dry product must have suitable characteristics for ultimate use. Thus the product must be free-flowing and be readily rehydratable on mixing with water to make a reconstituted juice. Fruit and vegetable juices contain sugars which induce formation of sticky and gummy dried products, therefore the preparation of free-flowing, easily rehydratable products is very difficult.

(6) In addition to the above quality considerations, the procedure must be economically feasible, thus the apparatus required, the time for processing, and so forth must be kept within reasonable limits.

Many different procedures have been advocated for dehydrating fruit and vegetable juices. None of them approach the ideal of meeting all the requirements. For example, freeze-drying procedures which involve sublimation of moisture from a frozen mass of the juice are effective from the standpoint of retaining natural flavor and odor but have the disadvantage of requiring expensive equipment and long processing times because sublimation from the solid state is a much slower process than evaporation from the liquid state. Further, to obtain sublimation one must use very high vacuum, that is, pressures on the order of 10–100 microns of Hg. Apparatus for creating and maintaining such high vacuum is very expensive initially and costly to operate.

Spray drying procedures have been advocated for dehydration of fruit and vegetable juices. Although spray drying is successful in many applications as in drying milk, eggs, soaps, detergents, etc., its use in connection with fruit and vegetable materials where the end products are highly hygroscopic is beset with many complications. For example, orange juice powder must be collected at a temperature below its sticky point temperature, otherwise the powder coalesces. This requisite low end or exhaust temperature automatically limits the range of inlet temperatures whereby the amount of juice fed per unit time is necessarily limited. Another consideration is that the inlet temperature also must be limited to prevent heat damage to the juice and powder. Another point is that the dried powder is in contact with the exhaust air stream which necessarily contains water vapor evaporated from the original juice. The relative humidity of the exhaust stream must be kept low to minimize re-absorption of this moisture by the powder. Adjustment of the conditions of drying to decrease the relative humidity of the exhaust air likewise limits the amount of juice treated per unit time. These factors of sticky point and possibility of re-absorption of moisture necessitating limitation of inlet temperature, exhaust temperature and feed rate all add up to the fact that spray drying of fruit and vegetable materials is not rapid and efficient as with spray drying of non-hygroscopic materials such as eggs, milk, soap, etc. Another point to be made is that spray drying has the disadvantage that the juice particles are subjected to huge volumes of heated air which means that the opportunity for oxidation with consequent development of off odors and flavors is greatly increased. In addition the small beads or bubbles of dry product formed by spray drying do not reconstitute as rapidly as desirable. Thus these beads tend to aggregate on contact with water so that reconstitution of such products requires several minutes of rapid agitation with water.

The procedure in accordance with this invention fulfills all the requirements for the successful dehydration of fruit and vegetable juice purees. Thus some of the advantages and features of the invention are as follows:

(a) The natural odor and flavor of the edible liquid are not impaired and further no detectable amount of off-odor or flavor is developed. Thus the final product upon reconstitution forms a juice, puree, etc. which can scarcely be distinguished from the natural material.

(b) The natural color of the liquid is retained—no browning or other development of unnatural color takes place.

(c) The dry product is freeflowing and has an extremely rapid rate of reconstitution. Thus to make a reconstituted juice, the necessary amount of water is added to the dry product and stirred. In 30 seconds or less the product is completely dispersed and the juice ready to serve. In this regard a reconstituted juice can be prepared in about the same time as required for reconstituting the concentrated frozen juices which are now enjoying such popularity. In contrast, spray dried products require stirring with water for 3 to 5 minutes or more to get a reconstituted juice. The product of this invention has an extremely high rate of rehydration because it is made up of a mass of expanded, porous, sponge-like particles and the water can rapidly enter into the interstices and dissolve the soluble material; the product is completely free from the aggregating tendency which is common to spray dried products.

(d) The dehydration process of this invention does not cause destruction to the vitamin content of the original juice. Thus the nutritive value of the juice is completely retained.

(e) The dehydration in accordance with the instant invention requires a comparatively short period of time—on the order of ½ to 2 hours. This of course is a drastic improvement over freeze-drying which because of the relative slowness of sublimation requires 8 to 12 or more hours.

(f) The dehydration is accomplished under vacuum. This means that little opportunity for oxidation and subsequent formation of off-odors and flavors is afforded. This of course is in sharp contrast to spray drying where each particle of juice is contacted with a large excess of hot air.

(g) In contrast to freeze drying, no freezing is used in our dehydration process. The concentrate is never subjected to freezing but is loaded into the vacuum drier at about room temperature and its temperature is maintained above freezing throughout the dehydration. This means that the expense of refrigeration is avoided. At the same time the procedure is more rapid as noted in paragraph (e).

(h) In our process quantitative yields of product are obtained. All the solids content put into the process is recovered. This is in sharp contrast to spray drying of fruit or vegetable juices where even under the best conditions anywhere from 5 to 20% of the product remains clinging to the walls of the spray drier chamber or the cyclone collector, requiring frequent shut-downs for cleaning.

(i) The product in accordance with this invention does not require refrigeration but can be stored at ordinary room temperatures or higher for very long periods of time with no loss in quality. Further, packages of the product need not be reconstituted all at once. A desired amount may be removed from the package for reconstitution and the package re-sealed until more of the product is needed. The free-flowing nature of the product contributes to the ease with which aliquots may be removed from the package as desired.

In the patent application of Sumner I. Strashun, Serial No. 291,817, filed June 4, 1952, there is disclosed a process for dehydrating fruit juices and other edible liquid materials of plant origin which involves concentrating the juice then dehydrating the liquid concentrate by maintaining it in contact with a heated surface while being exposed to vacuum, the conditions of temperature being controlled to get rapid dehydration without damage to the product. A primary advantage of the aforesaid process is that the drying under vacuum in contact with a hot surface results in a puffing or expansion of the material during the dehydration, this expansion being caused by the entrapment of a multitude of small steam bubbles throughout the mass. This expansion is very desirable as the final product is then in a porous form due to the presence of the numerous small voids. The product thus is easy to remove from the trays, breaks up easily into small particles or flakes and exhibits an extremely high rate of rehydration so that a reconstituted juice can be prepared by agitating with water for less than one minute. The expansion of the product also has the advantage that it accelerates the rate of dehydration. Thus when the material expands, moisture can diffuse out of the mass very readily so that dehydration is completed in a short time—an hour or less in many cases. Such favorable action cannot be obtained if the material would remain constant in volume or shrink during dehydration—in such case moisture diffuses slowly through the dense mass and the dehydration requires a long period of time—as much as ten times longer than where extensive expansion is obtained. A further advantage of expansion during dehydration is that in the expanded condition there is a pronounced evaporative cooling effect so that the temperature applied for dehydration can be high to get rapid dehydration without overheating the product. Where there is no expansion, the evaporative cooling effect is minor and dehydration temperatures must be kept low to prevent overheating—as a result the dehydration time is greatly extended.

It has been observed that in some instances—depending on the type of liquid material and its manner of preparation—expansion to a desirable extent does not take place during the dehydration step, when proceeding in accordance with the process of the aforementioned Strashun application. Intensive laboratory experimentation has shown that the pulp content of the liquid being treated must be controlled to get a desired degree of expansion. By the expression "pulp" is meant the insoluble material, usually of a fibrous and/or gel-like nature, which is suspended in juices and similar liquid products to a greater or lesser extent. For example the yellow color and typical flavor of orange juice is largely due to the finely divided pulp or cloud which is suspended in the relatively clear and tasteless serum. A glass of fresh orange juice allowed to stand overnight shows for example a typical separation of the pulp toward the bottom of the glass with the clear serum above it.

Our researches have shown that if too much pulp is present, the pulp in some way interferes with the expansion effect so that instead of the steam bubbles being trapped in the mass they escape with the result that the material undergoing dehydration remains constant or even decreases in volume. Both of these conditions are bad in that the final product is hard and difficult to break up into small fragments, it sticks tenaciously to the trays, and is very difficult and slow to rehydrate because of its dense, horny texture. Further, because of the dense nature of the material, diffusion of moisture is slow with the result that effective dehydration requires long periods of time—as much as 10 to 12 times longer than where the material expands. Just why the pulp should have such a drastic effect on the degree of expansion has not been ascertained but it may well be that the pulp affects the surface tension of the mass or decreases its elasticity.

Regardless of the theory involved it has been ascertained that if all or part of the pulp is removed prior to dehydration, the problem is solved and the material will expand properly during dehydration. One method of applying the principles of this invention in practice involves removing all of the pulp prior to dehydration whereby complete expansion during dehydration will be achieved. However, in many cases it is not essential to remove all of the pulp as a satisfactory degree of expansion can be attained even though some of the pulp is left in the liquid. The amount of pulp which may be safely left in the liquid to obtain satisfactory expansion will vary depending on the nature of the food product in question and will thus be different for tomato products, orange products, apricot products, etc. In the case of tomato, for instance, it has been found that the juice should contain less than 6% of pulp by volume to obtain satisfactory expansion—the volume of pulp is determined by centrifuging. Ordinary tomato juice contains about 20–30% pulp by volume and in this condition cannot be successfully dehydrated because it will not expand. Thus at least part of the pulp must first be removed to provide a juice of less than 6% pulp which is amenable to dehydration, that is, which will expand during dehydration. In the case of orange juice, successful dehydration can be accomplished with ordinary juice which usually contains about 12% pulp by volume. If however it is desired to dehydrate an orange puree or other liquid preparation containing more pulp then part of the pulp must first be removed so that the liquid being treated does not contain more than 12% pulp by volume. In such case the desired expansion will be obtained. The pulp content which can be tolerated with any particular juice or other liquid preparation can easily be determined by a pilot experiment on the lot in question. To this end, the liquid is concentrated then placed on the surface of a heater which is surrounded by a bell jar. The interior of the jar is evacuated while the heater surface is brought up to 200–212° F. The concentrate is observed through the bell jar to see if it expands. If the material expands at least three times, preferably 10 to 16 times, in volume, the pulp content is not too high and the material may be successfully processed. If the degree of expansion is less than specified above a further decrease in pulp content will be required to make the juice amenable to dehydration.

In applying this invention in practice suitable fruit or vegetable material is pressed, macerated, comminuted or otherwise treated by known techniques to produce a juice or other liquid preparation. It is obvious that the liquid preparation should be made from ripe, sound produce of high quality.

The liquid is then subjected to screening, filtration, centrifugation or the like to remove all or part of the pulp. If only part of the pulp is removed then the test described above can be applied to determine whether the pulp content in question can be tolerated.

The partly or completely de-pulped liquid is then subjected to concentration so that it will be in proper condition for the subsequent dehydration step. A single-strength juice cannot be subjected directly to the dehydration because it will boil and spatter violently and may not expand properly. On the other hand when the concentrate is applied in the dehydration it expands by entrapping the steam bubbles and little boiling or spattering is obtained. In general the liquid is concentrated as much as possible to still obtain a flowable liquid. Thus the subsequent dehydration step necessitates starting with a liquid concentrate but to decrease expense and time of dehydration as much moisture as possible should be removed during the concentration step to the point of obtaining a concentrate which is still capable of flowing. In many cases a satisfactory concentrate will have a density about from 35 to 80° Brix. As conventional in the concentration of fruit juices, it is preferred to conduct the concentration under vacuum at a temperature not over 50–125° F., in order to avoid heat damage to the material.

The concentrate as above prepared is then ready for dehydration to the solid state. This dehydration is preferably achieved by the application of vacuum to the concentrate while it is spread on a heated surface. To this end, the concentrate is poured on trays which are placed in a vacuum drier equipped with hollow shelves through which heating or cooling media can be circulated. The depth of liquid in the trays will depend on the available space between shelves, taking into account the fact that as the dehydration proceeds the material will expand in volume about 10 to 16 times. In general, to fully utilize the available space, the liquid level should preferably be such that after expansion it almost contacts the bottom of the shelf immediately above the tray. For example, in a drier having a 2½" space between shelves the concentrate is loaded to a depth of about ⅛" whereby it will expand to a depth of 2" on dehydration. If desired the expansion can be controlled, without interfering with expansion and formation of a sponge-like product, to prevent the product from contacting the shelf above it by placing a coarse wire screen, with openings ¾" to 1½" in diameter, above the layer of concentrate and spaced the desired distance thereover.

After inserting the trays containing concentrate into the drier, the drier is closed and vacuum applied, the vacuum being maintained until the dehydration is completed. It is a feature of the invention that pressures of around 2 to 20 mm. of Hg are used. Vacuums in this range are easy to obtain with relatively inexpensive equipment such as steam ejectors and require the pumping of relatively small volumes of water vapor as compared with systems using vacuums on the order of several microns where very expensive, efficient vacuum pumps, Dry Ice traps, etc. are essential. A heating medium is circulated through the hollow shelves so that the concentrate is heated by conduction through the tops of the shelves, the bottoms of the trays, and so to the product. Heating also takes place by radiation from the bottoms of the shelves to the surface of the concentrate on the shelves below. Usually it is desirable to start the circulation of hot medium prior to insertion of the trays so as to achieve more rapid heating. In such case the tray insertion and closing of the drier should be as rapid as possible to avoid heat damage to the concentrate. In any event the shelves are maintained at a temperature near or above the boiling point of water, i.e., about 150–300° F. Of course the product will not assume this high temperature because it is being cooled by the evaporative process. However, the temperature of the product should be checked from time to time. When the product temperature rises to about 110–175° F. (due to falling off of the rate of evaporation), the temperature of the circulating medium should be immediately decreased, as by circulating cold water, to abruptly decrease the shelf temperature, then a medium at about 110–175° F. is circulated through the shelves. The desideratum during this phase of the dehydration is to maintain the product temperature at about 110–175° F. until it is dry. The principle of the dehydration thus involves two distinct stages. In the first stage a high temperature is applied to the product but the rapid rate of evaporation keeps the product temperature down. As the rate of evaporation falls off and the product temperature rises the second stage is started. At this point the temperature applied to the shelves is reduced so that the product temperature remains at about 110–175° F. until the drying is completed. In many cases the upper limit of product temperature should be below 175° F. to avoid heat damage to the product. Thus for citrus product, a desirable temperature range for the second stage is about 110–125° F.; in the case of tomato, a desirable temperature range for the second stage is about 110–150° F. The two stage dehydration which we employ is advantageous because rapid evaporation of moisture is obtained yet heat damage to the product is minimized. Thus by applying a high temperature to the hollow shelves during the first stage, a very rapid evaporation of moisture is obtained whereas the cooling effect of the evaporation keeps the temperature of the product below temperatures at which damage would occur. In the second stage, the shelf temperature is lowered because the rate of evaporation has decreased. However even during this second stage, the product is maintained at a temperature at which evaporation takes place readily and the product temperature is below that at which damage would occur. It is to be noted that in changing over from the first stage to the second stage, the shelves cannot be instantaneously dropped to the desired temperature because of the large mass of metal which must be cooled. For this reason the product temperature may temporarily rise above 175° F. (or other upper limit used with the particular material). Exposure of the product to such an excessively high temperature for short periods of time will cause a negligible amount of heat damage.

When the drying cycle is completed as indicated by the product reaching the same temperature as the shelves thus signifying absence of evaporation, the temperature of the shelves is reduced by circulating cold water through the hollow shelves. The reason for this is to reduce the product temperature to 100° F. or below whereby the product loses its plastic character and becomes brittle and easily friable. The point is that while the mass is above 100° F., it is plastic and would be difficult to remove from the trays and even if removed would not break up properly. By cooling the mass it becomes easy to remove from the trays and easy to break up. Thus after the product is cooled to about 70 to 100° F., the vacuum is broken, the drier opened and the trays removed. By applying a spatula to the trays the product is easily removed, the scraping action of the spatula breaking up the product into a mass of fine flakes. For optimum results it is preferred that the vacuum drier be located in a room in which the atmosphere is regulated at a very low humidity. This will reduce any danger of moisture regain by the product.

The above-described dehydration process utilizes a vacuum tray drier; however, other types of dehydration equipment such as continuous belt dryers or tubular dryers operated under the same conditions of temperature and vacuum can be used.

The dry product which preferably contains around 1 to 3% moisture, is packaged in tin cans or other containers which can be sealed to an air tight condition. It is obvious that since the product is virtually completely dehydrated it is not perishable and may be kept indefinitely at room temperature or higher. For constitution the calculated amount of water is dumped onto the dehydrated product and after agitation for a few seconds is ready to serve.

Inasmuch as the dehydration of juices, purees, etc. in accordance with this invention necessitates removal of all or part of the pulp prior to dehydration, the final dehydrated juice or puree may contain an inadequate amount of pulp for forming a reconstituted product of the desired consistency. To overcome this situation the pulp which is removed from the original juice, puree, etc. may be dehydrated, then mixed with the product made by dehydrating the de-pulped juice or puree. The dehydration of the pulp presents no problems as it may be easily dried in many different types of apparatus. For example it is preferred to dry it in a vacuum tray dryer using the same two-stage temperature heating as explained above in connection with dehydration of the de-pulped liquid. Because of its high content of fibrous material, the pulp does not shrink during dehydration but maintains its original volume and forms a porous mass which is easy to remove from the trays and which is easy to break up into small fragments. Further, it slurries very rapidly when agitated with water and thus its addition to the dehydrated liquid fraction does not decrease the rate of reconstitution. Since the pulp has properties which make it easy to dry it is not essential to use a vacuum tray drier but one may also use a dryer of the drum, cabinet, or rotary kiln type.

In the dehydration of some juices, purees, etc., it may be necessary to make some provision for returning volatile flavoring materials which are vaporized during the concentration and/or dehydration. In the case of tomato and apricot products such provisions are not necessary as the dehydrated product retains its natural flavor and odor. In the case of orange, apple, pineapple, strawberry, raspberry, and many other fruit products provision should be made to restore flavoring substances to obtain a high-quality product. The restoration of flavor may be carried out in several different ways. Thus the volatile flavoring component is mixed with molten, supercooled sorbitol and the mixture allowed to crystallize. The sorbitol containing absorbed flavoring material is then incorporated with the dehydrated juice or mixture of dehydrated juice and pulp to furnish the approximately original amount of flavoring component. The use of sorbitol to absorb the flavoring component is preferred as thereby the flavor is stabilized and prevented from vaporizing. In some cases, absorption of the flavoring component on other solid materials such as sucrose, dextrose, gelatin, pectin, etc. can be applied. In the case of orange products, the flavoring component to be added in solid form by the above-detailed process may be orange peel oil obtained by cold pressing the peels after juice removal. In the case of apple, grape, strawberry, raspberry, cherry, pineapple, etc. the volatile flavoring component may be recovered during the processing of the original juice. Thus it is convenient to initially subject the juice to partial evaporation (stripping) at atmospheric pressure and recover the vaporized essence. This essence after concentrating by distillation is then ready for incorporation, absorbed on a solid material, with the dehydrated juice or dehydrated juice and pulp. If desired, the volatile flavoring component can be sealed in a gelatin capsule or other container made of soluble material, and placed in the package together with the dehydrated product. Another technique is to add to the concentrate, prior to dehydration, a volatile flavoring component in such proportion that after loss by volatilization during dehydration enough of the flavoring component will remain to give the final product a natural flavor and odor.

In some cases it may be desirable to add a dextrinous material such as dextrin, corn syrup, or corn syrup solids to the concentrate prior to dehydration in order to reduce spattering and to ensure satisfactory expansion during dehydration. If the concentrate is high in solids content, about 55° Brix or above, and its pulp content has been properly decreased, it will expand properly during dehydration without added dextrinous material. However, when dealing with concentrates of lower solids content it is sometimes desirable to add a dextrinous material to cause a large degree of expansion. The use of dextrinous material offers another advantage in that it reduces hygroscopicity of the final dehydrated product. Thus the finely divided product will not coalesce into lumps or other aggregates when exposed to the atmosphere. The amount of dextrinous material to be used will vary depending on the nature of the particular fruit or vegetable product in question. In general the proportion of dextrinous material may be varied from about 5 to 70% based on the fruit or vegetable solids in the liquid preparation. Corn syrup solids is the preferred dextrinous material as it can be added to the liquid concentrate without causing any dilution. As well known in the art, corn syrup is prepared by the partial hydrolysis of corn starch and contains dextrin, glucose and other sugars. By spray drying the corn syrup is converted into a solid material. Low conversion corn syrup and corn syrup solids are essentially bland materials having only a slight sweet taste hence their addition to the orange juice does not materially alter the taste of the orange product.

It is often desirable to add sulphur dioxide or other sulphiting agent to the liquid being treated to stabilize the final product and prevent browning during processing and storage of the finished article, particularly if stored at elevated temperatures. To this end sulphur dioxide, sodium sulphite or bisulphite is added in such amount that the dehydrated product will contain about from 50 to 250 p.p.m. of $SO_2$. A convenient point to add the sulphite or bisulphite is to the liquid concentrate prior to the dehydration. If necessary, ascorbic acid or fat-stabilizing antioxidants such as butylated hydroxyanisole or nordihydroguaiaretic acid may be added to the final product or to the liquid at any stage in the processing to prevent oxidation of flavoring and/or other oxidizable components.

In packaging the dehydrated products it is often advantageous to insert in the sealed package a porous container holding a desiccant. The desiccant has the effect of removing the last traces of moisture from the dehydrated product whereby to increase its stability and shelf life by promoting vitamin retention, preventing browning and decreasing off-flavor formation. It is known that for maximum stability the dehydrated products should have a moisture content of less than 1%. However, to obtain such a low moisture level by dehydration would require an excessive period of time and increase the possibility of heat damage. For this reason by the use of a desiccant the powder may be packaged at say 3% moisture content and the desiccant will gradually lower the moisture content of the product to minimum levels during storage. Although it is preferred to use calcium oxide as the desiccant one may also use calcium chloride, magnesium perchlorate, calcium sulphate, etc.

The following examples illustrate the invention in greater detail:

EXAMPLE I

A lot of tomato juice was subjected to filtration to remove essentially all the pulp thus to obtain a clear, straw-colored serum.

The serum was concentrated in a falling-film evaporator at 130° F. under vacuum of 115 mm. Hg thus to prepare a 9-fold concentrate, 46.1° Brix.

The concentrate was poured into trays at a loading of about ½ lb. per sq. ft. which gave a liquid depth of about ⅛". The trays were placed on shelves of a vacuum drier. The drier was closed and the vacuum applied. The following log sets forth the conditions of dehydration:

| Time, min. | Pressure, mm. of Hg | Temperature of shelves, ° F. | Average temperature of product, ° F. | Other conditions |
|---|---|---|---|---|
| 0 | 760 | 64 | 60 | Vacuum started. |
| 10 | 50 | 64 | | Steam circulated through shelves at 12 minutes. |
| 45 | 2 | 200 | 120 | Cold water circulated through shelves at 65th minute. |
| 65 | 2 | 200 | 155 | |
| 90 | 2 | 155 | 143 | Circulating water adjusted to 155° F. |
| 120 | 2 | 155 | 155 | At 120 minutes, cold water was circulated through the shelves until product temp. was about 80° F. Vacuum was then broken, drier opened and product removed. |

In this dehydration the initial state (first 12 minutes) was conducted at room temperature to avoid spattering of the concentrate.

It was noted that during dehydration the concentrate expanded to a level of about 2 inches indicating a 16-fold volume expansion. The volume of the product remained constant even after the vacuum was broken and the trays removed. The cooled dehydrated product (moisture content, 3–4%) was removed from the trays with a spatula. It was observed that the product de-trayed very easily and the action of the spatula broke it up into fine flakes. The flaked product was free-flowing and by mixing a few seconds with water formed a reconstituted juice.

The pulp removed from the original juice was dried in a vacuum tray drier at a pressure of 2 mm. Hg and with the shelf temperature maintained at 200° F. for one-half hour, then reduced to 100° F. and maintained at this level until dehydration was complete. The dried pulp was easily removed from the trays and broke up readily into small flakes.

The dried pulp and the dried serum were mixed together in the ratio of ¼ lb. dry pulp to 2 lbs. dry serum thus to produce a solid, free-flowing material useful as a stable, self-preserving source of tomato juice or other liquid tomato product. To prepare a reconstituted tomato juice, 2 teaspoons of the dry mixture are place in a glass, 6 oz. of water is added and after agitation for a few seconds a reconstituted juice of good, natural flavor and odor is produced. The dry mixture need not necessarily be used as a source of juice alone but is equally useful as a source of other products. Thus a dry mixture of water ratio of 6 parts by weight dry mixture to 94 parts by weight of water gives a juice of 6% total solids. If a thicker product is desired it is only necessary to use less water. Thus one can readily prepare a puree or a paste of any desired solids content. If desired, flavoring materials may be incorporated into the dry mixture such as spices, mustard, dry onion or garlic, pepper, etc. In this way one can prepare a product which on stirring with water forms in a few seconds a ketchup or sauce.

Comparative experiments

The concentration and dehydration processes of Example I were repeated employing a tomato juice containing the usual pulp content, i.e., 20 to 30% by volume and other lots of tomato juice containing decreased amounts of pulp, namely, 10%, 7%, 6%, 2%, 1%, and 0.5% by volume. It was observed that in each case where pulp volume was 6% or more, no expansion took place during dehydration resulting in dense, horny products which adhered to the trays and which were not easily reconstitutable in that they require agitation with water for long periods to form the reconstituted juice. Further, it was observed that the dehydration was not complete in one or 2 hours but required extended operation of the drying cycle to reach a low level of moisture content. On the other hand, all samples containing less than 6% pulp volume expanded and dried satisfactorily within two hours.

EXAMPLE II (a) A lot of orange juice having a pulp content of 12% by volume was concentrated to 60° Brix by high-vacuum, low-temperature evaporation.

(b) A lot of orange juice having a pulp content of 18% by volume was concentrated to 60° Brix by high-vacuum, low-temperature evaporation.

The two samples of concentrate were then subjected to dehydration in a vacuum tray dryer under the same conditions. Thus the trays of concentrate were inserted in the dryer and the vacuum applied to keep the drier at a pressure of 2 mm. Hg. The initial shelf temperature was 200° F.; this temperature being maintained until the product temperature reached 120° F. (25 minutes). The temperature of the shelves was then dropped to 125° F. and maintained at this level until the 45th minute. After this time cool water was circulated through the shelves and the vacuum broken and the products removed after 60 minutes of operation.

It was observed that in the case of sample A (made from juice containing 12% pulp) the concentrate expanded about 16 times in volume during the dehydration thus to produce a final product which was porous, easy to remove from the trays, broke up readily into flakes which reconstituted by stirring with water for a few seconds. Further, the final product was properly dehydrated having a moisture content of 4.5%.

In the case of sample B (made from juice containing 18% pulp), the concentrate did not expand during the dehydration. Further, the product was not properly dehydrated and was moist and pasty. To obtain further dehydration, this product was dried overnight under vacuum with a shelf temperature of 100° F. The next day the dry product was observed and found to be hard and adhered tightly to the trays. The product would not readily dissolve in water but required intensive agitation with the water for more than 3 minutes to form a reconstituted juice.

Having thus described our invention, we claim:

1. A process for preparing solid dehydrated products from tomato juice which comprises separating at least part of the pulp from the tomato juice to produce a juice containing less than 6% pulp, concentrating this juice to produce a liquid concentrate, and dehydrating the liquid concentrate to a solid state by exposure to a vacuum while the concentrate is in contact with a heated surface.

2. The process of claim 1 wherein the removed pulp is dehydrated and admixed with the dehydrated juice.

3. A process for preparing solid dehydrated products from tomato juice which comprises separating substantially all of the pulp from the tomato juice, concentrating the resulting juice to a liquid concentrate about from 35 to 80° Brix, dehydrating the concentrate to a solid state by the use of vacuum and a heating medium, the temperature of the heating medium being maintained at about 150–300° F. until the concentrate temperature rises to about 110–150° F., the temperature of the heating medium being then decreased and maintained at about 110–150° F. until the dehydration is completed, dehydrating the separated pulp and admixing the dehydrated juice and the dehydrated pulp.

4. A process for preparing solid dehydrated products from tomato juice which comprises separating substantially all of the pulp from the tomato juice, concentrating the resulting juice to a liquid concentrate about from 35 to 80° Brix, dehydrating the concentrate to a solid state by the use of vacuum and a heating medium, the temperature of the heating medium being maintained at about 150–300° F. until the concentrate temperature rises to about 110–150° F., the temperature of the heating medium being then decreased and maintained at about 110–150° F. until the dehydration is completed, dehydrating the separated pulp, admixing the dehydrated juice and dehydrated pulp, and packaging the admixture in a container together with a porous receptacle holding a desiccant.

References Cited in the file of this patent

UNITED STATES PATENTS

| | | |
|---|---|---|
| 1,273,072 | Kuzmier | July 16, 1918 |
| 2,641,550 | Dykstra et al. | June 9, 1953 |
| 2,647,059 | Wenzelberger | July 28, 1953 |

OTHER REFERENCES

Food Technology, volume 1, No. 1, January 1947, pages 85 to 94.